United States Patent
Nguyen et al.

(10) Patent No.: US 9,007,945 B2
(45) Date of Patent: Apr. 14, 2015

(54) AUTOMATED NETWORK SERVICE DISCOVERY AND COMMUNICATION

(71) Applicant: Dell Products L.P., Round Rock, TX (US)

(72) Inventors: Cuong Nguyen, Austin, TX (US); Charles T. Perusse, Jr., Pflugerville, TX (US); Jon Robert Hass, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 150 days.

(21) Appl. No.: 13/748,204

(22) Filed: Jan. 23, 2013

(65) Prior Publication Data

US 2014/0204803 A1    Jul. 24, 2014

(51) Int. Cl.
*G01R 31/08*    (2006.01)
*H04L 12/28*    (2006.01)
*H04L 12/24*    (2006.01)

(52) U.S. Cl.
CPC ........ *H04L 41/5054* (2013.01); *H04L 41/5058* (2013.01); *H04L 41/28* (2013.01)

(58) Field of Classification Search
None
See application file for complete search history.

(56) References Cited

U.S. PATENT DOCUMENTS

| | | | | |
|---|---|---|---|---|
| 6,604,140 | B1* | 8/2003 | Beck et al. | 709/226 |
| 6,845,393 | B1* | 1/2005 | Murphy et al. | 709/220 |
| 7,155,502 | B1* | 12/2006 | Galloway et al. | 709/223 |
| 2003/0018787 | A1* | 1/2003 | Neal et al. | 709/227 |
| 2007/0141988 | A1* | 6/2007 | Kuehnel et al. | 455/41.2 |
| 2008/0147842 | A1* | 6/2008 | Mohri et al. | 709/223 |
| 2009/0210530 | A1* | 8/2009 | Modi | 709/226 |
| 2012/0102179 | A1* | 4/2012 | Qiu et al. | 709/223 |
| 2012/0136984 | A1* | 5/2012 | Wang et al. | 709/223 |
| 2013/0128756 | A1* | 5/2013 | Zhang et al. | 370/252 |
| 2013/0166703 | A1* | 6/2013 | Hammer et al. | 709/220 |

OTHER PUBLICATIONS

"Fibre Channel over Ethernet (FCoE);" http://www.t11.org/fcoe.

* cited by examiner

*Primary Examiner* — Hassan Phillips
*Assistant Examiner* — Hicham Foud
(74) *Attorney, Agent, or Firm* — Haynes and Boone, LLP

(57) ABSTRACT

A network switch includes a service registration database and a service discovery engine that is coupled to the service registration database. The service discovery engine receives a first service registration over a network from a first service included on a first service device and, in response, stores the first service registration in the service registration database. The service discovery engine then receives a multicast service discovery message over the network from a target device. The service discovery message includes a service identification. The service discovery engine then determines that the service identification is associated with the first service registration stored in the service registration database and, in response, sends a unicast service communication message over the network to the target device. The service communication message includes communication information for the first service. The service registration database may store a plurality of different service registrations for respective different services.

20 Claims, 4 Drawing Sheets

AUTOMATED NETWORK SERVICE DISCOVERY AND COMMUNICATION

BACKGROUND

The present disclosure relates generally to information handling systems, and more particularly to the automation of the discovery of services provided by information handling systems over a network to allow communication with those services.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Conventionally, when target IHSs are deployed in a network, they must be provisioned with a default configuration (e.g., an Internet Protocol (IP) address and initial management credentials) and become known to the appropriate management IHS before they can be fully managed. While the processes for doing so differs across different types of target IHSs and/or management IHSs, all require manual operations by a network administrator that are complex and error-prone.

For example, the deployment of a switch IHS in a network typically includes first connecting the switch IHS to the network. The network administrator must then configure the IP address of the switch IHS or make sure that the Dynamic Host Configuration Protocol (DHCP) server is set up to supply the switch IHS with an IP address, depending on the switch default configuration. The network administrator must also configure the default initial configuration which, at a minimum, will include providing an initial security credential for Simple Network Management Protocol (SNMP) and Common Language Infrastructure (CLI) so that the switch IHS may be remotely managed. In some situations, the network administrator may set up the DHCP response to include a pointer to a Trivial File Transfer Protocol (TFTP) server that will have the default initial configuration file for the switch IHS, which must have the appropriate credential for initial access, requiring the network administrator to manually configure the DHCP server to respond to the management Media Access Control (MAC) address of the switch IHS so that the correct configuration file may be referenced. The network administrator may now either manually add the switch IHS to the management system (adding the switch IP address and management credential) or may request that the management system 'discover' the switch IHS (either periodically or using a manual trigger process), which is typically accomplished by scanning the IP address range for a new device responding to the management protocol and predefined management credential.

In another example, the deployment of a server IHS in a network typically includes connecting the server IHS to the network. A client running on a remote access controller coupled to the server IHS may use a number of different methods to attempt to locate a provisioning service running within the network. One method includes using the DHCP response with option 43 containing the IP address of the provisioning service, which requires that the network administrator properly configure the DHCP server to respond to the server IHS with the IP address of the provisioning service (to make sure such a response is only provided to this type of server IHS, as other devices make use of DHCP option 43 in different ways.) Another method includes using a well-known host name for the provisioning service to allow the client to attempt to use the Domain Name System (DNS) to resolve a well-known host name for the provisioning service, which requires that the network administrator configure the DNS server(s) with the appropriate host name and may also involve the use of a DNS load balancer to distribute the client request to the appropriate provisioning service. Yet another method involves the network administrator manually configuring the provisioning service as part of the onboarding process. Once the client finds the provisioning service, the client and provisioning service will perform a mutual exchange of security certificate and the provisioning service will then configure the client with its actual management credential. The management system may then use the provisioning service to retrieve information about the server IHS and access the management credential required to manage the server IHS.

While the processes above for adding new devices to a network and management domain are different, and other processes may be used, they all share common requirements: the newly added device must be discovered or added to the network and the management system must have the appropriate security credential to manage the device. Accomplishing this initial 'bootstrap' of the devices requires manual network administrator actions and setup and maintenance by the network administrator of external services. As networks become relatively large, this process becomes complex and error prone.

Accordingly, it would be desirable to provide an improved network system.

SUMMARY

According to one embodiment, a network switch includes a service registration database; and a service discovery engine that is coupled to the service registration database and that is operable to: receive a first service registration over a network from a first service included on a first service device and, in response, store the first service registration in the service registration database; receive a multicast service discovery message over the network from a target device, wherein the service discovery message includes a service identification; and determine that the service identification is associated with the first service registration stored in the service registration database and, in response, send a unicast service communication message over the network to the target device, wherein the service communication message includes communication information for the first service.

BRIEF DESCRIPTION OF THE DRAWINGS

FIG. 3b is a schematic view illustrating an embodiment of the networked system of FIG. 2 after the method of FIG. 3a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
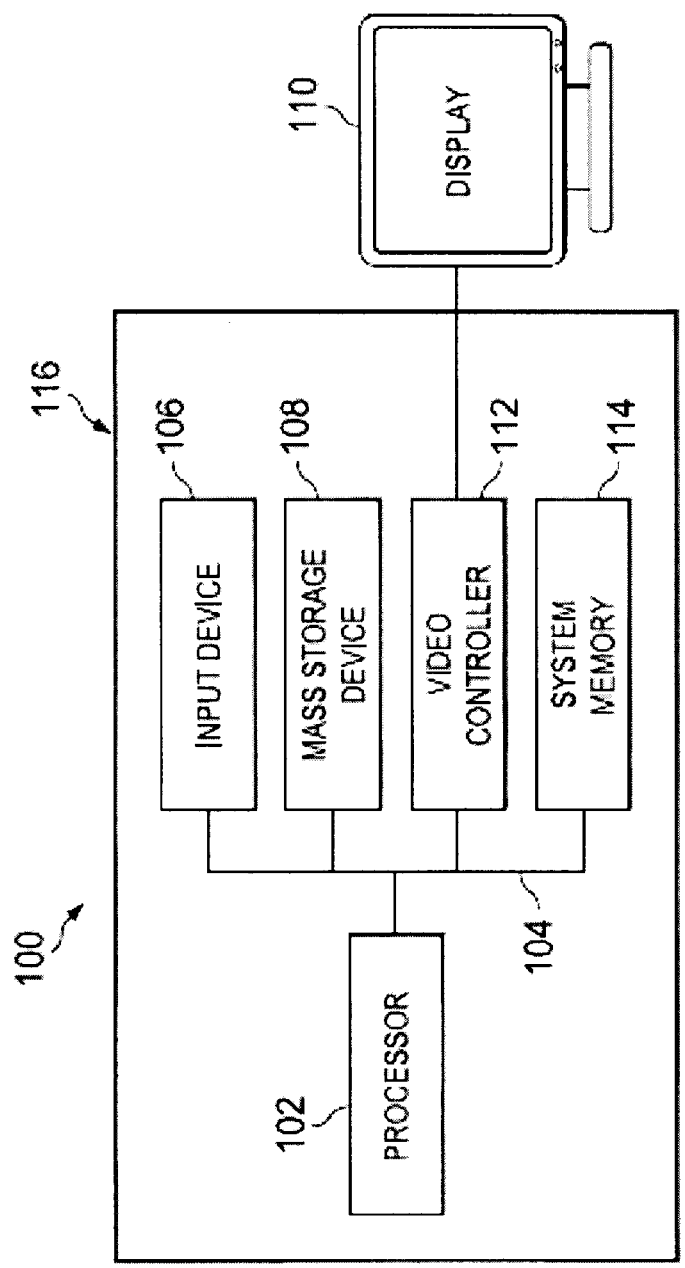
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
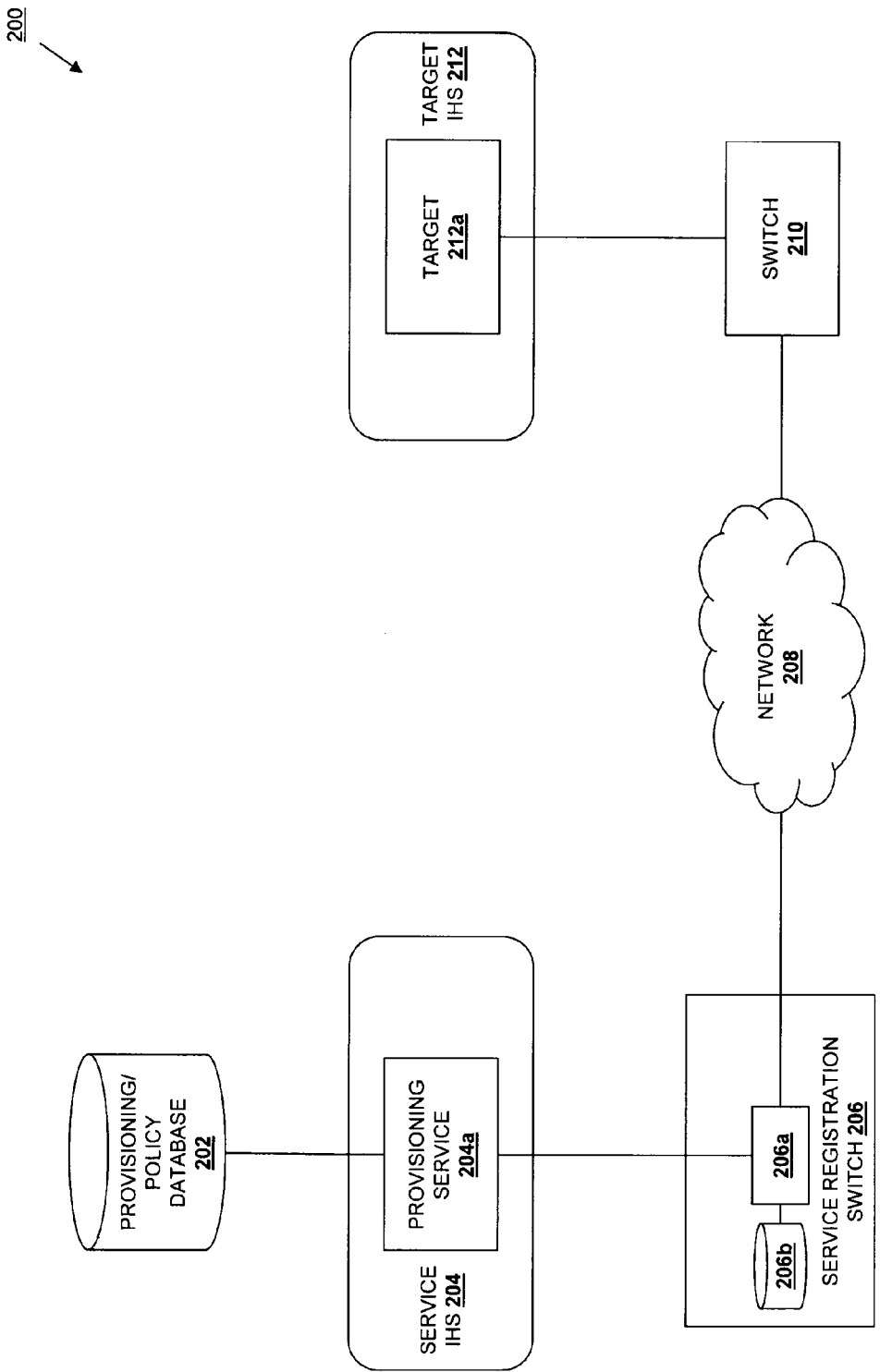
FIG. 2 is a schematic view illustrating an embodiment of a networked system.

Referring now to FIG. 2, an embodiment of a networked system 200 is illustrated. The networked system 200 of the illustrated embodiment is a simplified view intended to provide clarity in describing and illustrating the operation of the system, and one of skill in the art will recognize that a variety of devices, networks, and other network components may be connected to those illustrated while remaining within the scope of the present disclosure. The networked system 200 includes a provisioning/policy database 202 which may be, for example, a storage device on an IHS similar to the IHS 100 discussed above with reference to FIG. 1. The policy/provisioning database 202 may store a variety of network information known in the art depending on the type of service and/or target used in the networked system 200. For example, for a provisioning service and target, the policy/provisioning database 202 may store credential and initial service address information needed for service/target communication to complete an initial "handshake". In another example, for a storage system and target, the policy/provisioning database 202 may a list of available Logical Unit Numbers (LUNs), capacity information, access speed information, and other storage properties along with credential information. Furthermore, other services are envisioned as falling within the scope of the present disclosure, including streaming services, application services (e.g., database services, translation services, dictation services, etc.), and/or a variety of other services known in the art, and one of skill in the art will recognize that the policy/provisioning database 202 will store different information depending on the service being provided. A service IHS 204 is coupled to the provisioning/policy database 202 (e.g., directly, through another device, through a network, and/or in a variety of other manners known in the art.) In an embodiment, the service IHS 204 may be the IHS 100 discussed above with reference to FIG. 1 and/or include some or all of the components of the IHS 100. The service IHS 204 includes a provisioning service 204a that may include instructions that are stored on a non-transitory, computer-readable medium (e.g., the system memory 114 discussed above with reference to FIG. 1) and that, when executed by a processor (e.g., the processor 102 discussed above with reference to FIG. 1), cause the processor to perform the functions of the provisioning service 204a discussed below. While the service IHS 204 has been described as a physical IHS, one of skill in the art will recognize that the service IHS 204 may be virtualized while remaining within the scope of the present disclosure.

In the embodiment discussed below, the provisioning service 204a is a server Lifecycle Controller (LC) provisioning service (available from the assignee of the present disclosure, Dell Computers, Inc.) that operates on a remote access controller (either included in or coupled to the service IHS 204) and that provides for discovering server IHSs over one or more networks and automatically provisioning initial credentials for the service IHSs. However, in other embodiments, the provisioning service 204a may be provided by any client/server application that requires a client to be configured with a server IHS address or to discover the server IHS address including, for example, an Advanced Infrastructure Manager (AIM®) controller provided by the assignee of this disclosure, Dell Computers Inc., or an Openflow controller operating according to the Openflow standard. Furthermore, one of skill in the art will recognize that a variety of services other than the provisioning services discussed above will benefit from, and fall within the scope of, the systems and methods described in the present disclosure.

A service registration switch 206 is coupled to the service IHS 204 (e.g., directly, through another device, through a network, and/or in a variety of other manners known in the art.) In an embodiment, the service IHS 204 may be connected to a port on the service registration switch 206 that is associated with a Virtual Local Area Network (VLAN) such as, for example, a management VLAN. In an embodiment, the service registration switch 206 is a switch IHS that may include some or all of the components of the IHS 100 discussed above with reference to FIG. 1. The service registration switch 206 includes a service discovery engine 206a that may include instructions that are stored on a non-transitory, computer-readable medium (e.g., the system memory 114 discussed above with reference to FIG. 1) and that, when executed by a processor (e.g., the processor 102 discussed above with reference to FIG. 1), cause the processor to perform the functions of the service discovery engine 206a discussed below. The service registration switch 206 also includes a service registration database 206b that is coupled to the service discovery engine 206a. In an embodiment, the service registration database 206b includes a storage device such as, for example, the storage device 108 discussed above with reference to FIG. 1. While the service registration switch 206 has been described as a physical switch, one of skill in the art will recognize that the service registration switch 206 may be virtualized while remaining within the scope of the present disclosure.

The service registration switch 206 is coupled to a network 208 (e.g., directly, through another device, through another network, and/or in a variety of other manners known in the art) that is further coupled to a switch 210. In embodiment, the switch 210 may be a switch without service registration (i.e., the service registration provided by the service registration switch 206 as discussed below). In other embodiments, the switch 210 may provide service registration in substantially the same manner as discussed below for the service registration switch 206, and thus may include a service discovery engine and service registration database as well. Thus, the networked system 200 includes one or more switches that provide service registration and may include one or more switches that do not provide service registration. While the switch 210 has been described as a physical switch, one of skill in the art will recognize that any switches discussed herein may be virtualized while remaining within the scope of the present disclosure.

The switch 210 is coupled to a target IHS 212 (e.g., directly, through another device, through another network, and/or in a variety of other manners known in the art). In an embodiment, the target IHS 212 may be the IHS 100 discussed above with reference to FIG. 1 and/or include some or all of the components of the IHS 100. The target IHS 212 includes a target 212a that may include instructions that are stored on a non-transitory, computer-readable medium (e.g., the system memory 114 discussed above with reference to FIG. 1) and that, when executed by a processor (e.g., the processor 102 discussed above with reference to FIG. 1, a service processor in a remote access controller, etc.), cause the processor to perform the functions of the target 206a discussed below. In the embodiment discussed below, the target 212a may include a server Lifecycle Controller (LC) client (available from the assignee of the present disclosure, Dell Computers, Inc.) that operates on a remote access controller (either included in or coupled to the target IHS 212) and that operates by communicating with a LC controller (e.g., the provisioning service 204a). However, in other embodiments, the target 212a may be any client needing to be configured with a server IHS address or to discover the server IHS address such as, for example, an AIM® client provided by the assignee of this disclosure, Dell Computers Inc., or an Openflow client operating according to the Openflow standard. Furthermore, one of skill in the art will recognize that a variety of clients other than the clients discussed above will benefit from, and fall within the scope of, the systems and methods described in the present disclosure. While the target IHS 212 has been described as a physical IHS, one of skill in the art will recognize that the target IHS 212 may be virtualized while remaining within the scope of the present disclosure.

Figure 3A:
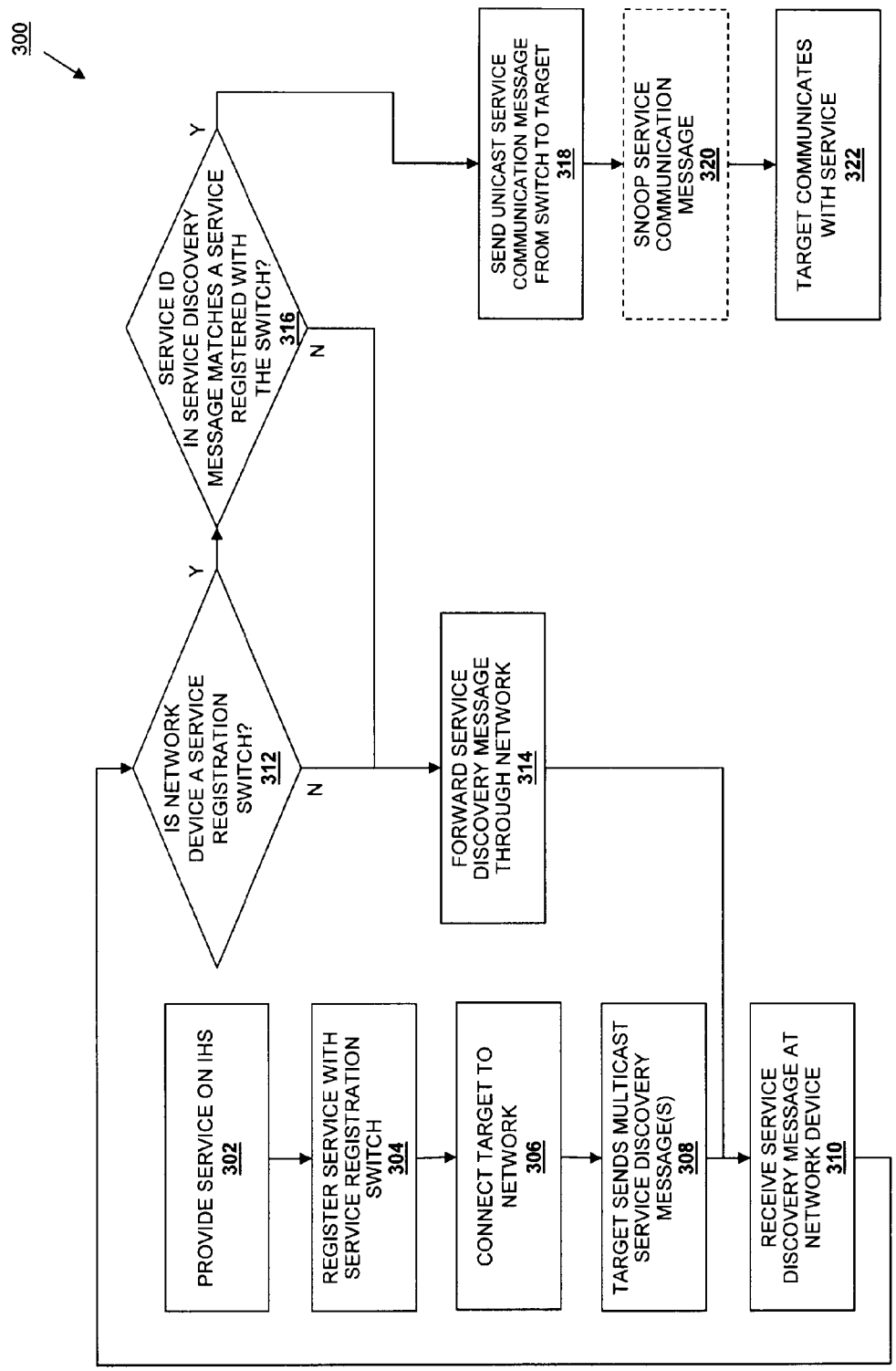
FIG. 3a is a flow chart illustrating an embodiment of a method for service discovery in a networked system.

Referring now to FIGS. 2 and 3a, an embodiment of a method 300 for providing service discovery is illustrated. The method 300 allows the target 212a, upon being coupled to the networked system 200, to automatically find the provisioning service 204a (or any service the target needs to find) in order to bootstrap itself sufficiently so that it can be managed by a management system (e.g., an LC controller) without any further user interaction. As discussed below, this is accomplished by allowing services to register with switches in the network so that they may be discovered by targets, and then automatically setting up the communications between a target and a service without any user interaction once the target discovers the service.

The method 300 begins at block 302 where a service is provided on an IHS. In an embodiment, the provisioning service 204a is provided on the service IHS 204 by a user of the networked system 200 such as, for example, a network administrator, a service IHS user, and/or a variety of other users known in the art. For example, the user may load an LC controller on the service IHS 302 using methods known in the art.

The method 300 then proceeds to block 304 where the service is registered with the service registration switch. In an embodiment, block 304 may be performed in response to connecting the service IHS 204 to the service registration switch 206 (e.g., directly, through a network, through one or more devices, and/or in a variety of other manners known in the art) after the provisioning service 204a has been provided on the service IHS 204a. In another embodiment, block 304 may be performed in response to providing the provisioning service 204a on the service IHS 204a when the service IHS 204 is already connected to the service registration switch 206 (e.g., directly, through a network, through one or more devices, and/or in a variety of other manners known in the art). Thus, the registration of the provisioning service 204a with the service registration switch 206 may occur automatically once the provisioning service 204a is connected to the service registration switch 206 and without any interaction from the user other than the providing of the provisioning service 204a on the service IHS 204. In other embodiments, the user may instruct the provisioning service 204a to register with the service registration switch 206 using the service IHS 204 (e.g., by providing the instruction to the service IHS 204 using an input device on the service IHS 204.)

At block 304, the provisioning service 204a registers with the service registration switch 204 by transmitting a service registration to the service registration switch 206. In an embodiment, the service registration includes information identifying the provisioning service 204a, information identifying the communication details for the provisioning service, and/or a variety of other service registration information known in the art. As discussed above, details of the information for communicating between a service and a target in the present disclosure depends on the type of service being used in the networked system 200, and any information that is relevant to communication between the service and the target may be included in the service registration. For example, the provisioning service 204a may provide the service registration switch 206 with a unique service identification, the Internet Protocol (IP) address of the service IHS 204, the management Virtual Local Area Network (VLAN) that the provisioning service 204a is operating on, and/or a variety of other information about the provisioning service 204a. The service registration is received by the service discovery engine 206a in the service registration switch 206a and, in some embodiments, some or all of the information in the service registration is stored in the service registration database 206b In some embodiments, unique service identifications may be provided for services by a service provider, and thus it should be understood that a plurality of services in the networked system may register with service registration switches with their own unique service identifications. In some embodiments, service registration at block 304 may be secured (e.g., to prevent rogue service registration) by authenticating the provisioning service 204a during service registration (e.g., using 802.1x). However, authenticating service registration will require some user provisioning of the networked system 200, so when security is not an issue (e.g., in an already secured network) and automation is desired, service registration authentication is not required.

In one specific example, service registration at block 304 may leverage a vendor specific Type Length Value (TLV) element within a Link Layer Discovery Protocol (LLDP) packet to assist in registering the provisioning service 204a with a port on the service registration switch 206. As is known in the art, LLDP packets may include any number of vendor specific TLVs that carry information. During service registration at block 304, if the service discovery engine 206a in the service registration switch 206 does not recognize a subset of one or more TLVs in an LLDP packet received from a service during service registration at block 304, that LLDP packet may be ignored. However, when the subset of one or more TLVs in an LLDP packet received from a service is recognized, the service discovery engine 206a in the service registration switch 206 may determine that the service is designed or authorized to register with the service registration switch 206 and, in response, register that service by storing the service identification, IP address, management VLAN, and any other information in the service registration in the service registration database 206b.

The method 300 then proceeds to block 306 where a target is connected to a network. In an embodiment, block 306 may include the connecting the target IHS 212 to the networked system 200 after the target 212a has been provided on the target IHS 212 (e.g., by a network administrator, a target IHS user, etc.). In another embodiment, block 306 may include providing the target 212a on the target IHS 212 when the target IHS 212 is already connected to the networked system 200.

The method 300 then proceeds to blocks 308 and 310 where the target sends one or more multicast service discovery messages and a multicast service discovery message is received at a network device. In an embodiment, the sending of the one or more multicast service discovery messages may occur automatically once the target 212a is connected to the networked system 200 and without any interaction from the user other that the provision of the target 212a on the target IHS 212 and/or the connection of the target 212a to the networked system 200. In other embodiments, the user may instruct the target 212a to send the one or more service discovery messages using the target IHS 212 (e.g., by providing the instruction to the target IHS 212 using an input device on the target IHS 212.)

As is known in the art, multicasting provides for the sending of information to a plurality of network devices simultaneously in a single transmission, with the information retransmitted by a receiving network device to other network devices when the network topology calls for it. At block 308, the one or more multicast service discovery messages are sent that each include one or more service identifications, a target identification, communication information for communicating with the target 212a, and/or a variety of other networking information known in the art. As discussed above, details of the information for communicating between a service and a target in the present disclosure depends on the type of service being used in the networked system 200, and any information that is relevant to communication between the service and the target may be included in the service registration. In some embodiments, the target 212a may send a separate multicast service discovery message for each service that target 212a is to communicate with, while in other embodiments, the target 212a may send a single multicast service discovery message including information about a plurality of services the target 212a is to communicate with. At block 308, the target 212a may send the one or more multicast service discovery messages using a predefined service discovery Media Access Control (MAC) address provided for the networked system 200 to enable the discovery discussed herein. In an embodiment, the multicast service discovery message may include one or more packets that are propagated within a single Layer 2 (L2) domain to a network device.

In a specific example of block 308, the target IHS 212 is a server including a target 212a that is an embedded LC client that needs to find the LC provisioning service 204a in the service IHS 204. In response to being connected to the networked system 200, the LC client sends a multicast service discovery packet using a predefined service discovery MAC address, and that multicast service discovery packet is propagated through a single L2 domain to the LC provisioning service 204a. In an embodiment, the use of a predefined service discovery MAC address for the networked system 200 to enable the discovery discussed herein provides benefits over prior art discovery systems and methods that use L2 multicast addresses that must be registered with the Internet Assigned Numbers Authority (IANA), as those prior art discovery systems and methods are very difficult to maintain when supporting multiple different services operating on the same network at the same time (e.g., each service would need its own unique discovery MAC address and snooping bridges would need to know about those unique discovery MAC addresses to fully automate the system.) Thus, embodiments of the present disclosure only require one service discovery MAC address, which may then be included in multicast service discovery messages and referenced to determine what service a target is looking for. This allows services to be defined dynamically and without the need to register with IANA (as is required with multicast MAC addresses), allowing an infinite number of services to be incorporated into the system.

The method 300 then proceeds to decision block 312 where it is determined whether the network device that received the service discovery message at block 310 is a service registration switch. In some embodiments, the switch 210 is not a service registration switch and, at block 310, the switch 210 receives the service discovery message multicast by the target at block 308 and, at decision block 312, the method 300 then proceeds to block 314. At block 314, the service discovery message is forwarded through the network by the network device that received it and that is not a service registration switch. In the embodiment in which the switch 210 is not a service registration switch, the switch 210 forwards the service discovery message through the networked system 200. Thus, at decision block 312 and block 314 of the method 300, network devices that receive a multicast service discovery message but that are not service registration switches propagate the multicast service discovery message throughout the networked system 200.

If, at decision block 312, the network device that received the service discovery message at block 310 is a service registration switch, the method 300 then proceeds to decision block 316 where it is determined whether a service identification in the service discovery message matches a service registered with the service registration switch. For example, the service discovery message may be received at the service registration switch 206 by the service discovery engine 206a at block 310 which, at decision block 312, will cause the method 300 to proceed to decision block 316. At decision block 316, the service discovery engine 206a retrieves the service identification(s) from the service discovery message, compares that/those service identification(s) with service identification(s) stored in the service registration database 206b, and determines whether the service identification in the service discovery message matches any service identification stored in the service registration database (and thus a service registered with the service registration switch 206.)

If, at decision block 316, it is determined that the service identification(s) in the service discovery message does not match a service registered with the service discovery switch, the method 300 proceeds to block 314 where the service discovery message is forwarded through the network substantially as discussed above. Thus, in an embodiment, the service discovery engine 206a determines that the service identification(s) in the service discovery message does/do not match any service identifications stored in the service registration database 206b and, in response, forwards the service discovery message through the networked system 200. If, at decision block 316, it is determined that a service identification in the service discovery message matches a service registered with the service discovery switch, the method 300 proceeds to block 318 where a unicast service communication message is sent from the service discovery switch to the target. Thus, in an embodiment, the service discovery engine 206a determines that a service identification in the service discovery message matches a service identification stored in the service registration database 206b and, in response, sends a unicast service communication message through the networked system 200 to the target 212a. In an embodiment in which the target 212a is requesting multiple services registered with the service registration switch 206, the service discovery engine 206a may send a single unicast service communication message including information for each requested service, or multiple unicast service communication messages, each including information for one of the requested services.

In an embodiment, the unicast service communication message sent at block 318 is an L2 unicast packet that includes communication information such as, for example, the service identification being discovered, a VLAN on which the service resides, a MAC address for the service IHS, any information provided in the service registration, and/or a variety of other communication information known in the art that facilitates communication with the provisioning service 204a through the service IHS 204 over the networked system 200. For example, the communication information may include some or all of the information provided by the provisioning service 204a and stored by the service registration switch at block 304. In an embodiment, the unicast service communication message is propagated within a single Layer 2 (L2) domain TO the target 212a.

In an embodiment, the switch 210 is an access switch to which the target IHS 212 connects to the networked system 200, and the switch is operable to snoop service communication messages. In such an embodiment, the method 300 may include optional block 320 where the service communication message is snooped. In this embodiment, just prior to forwarding the service communication message to the target 212a, the switch 210 snoops the service communication message to retrieve information embedded in the service communication message. For example, the switch 210 may retrieve information embedded in the service communication message about the management VLAN used to communicate with the provisioning service 204a. In response to retrieving the information from the service communication message, the switch 210 automatically act upon that information by, for example, adding the management VLAN of the provisioning service 204a to a port on the switch 210 that is coupled directly to the target IHS 212 and used by the target 212a. In some examples, the adding of a VLAN to the port on the switch 210 that is coupled to the target IHS 212 and used by the target 212a may provide for the correct IP address in response to a Dynamic Host Configuration Protocol (DHCP) request.

Figure 3B:
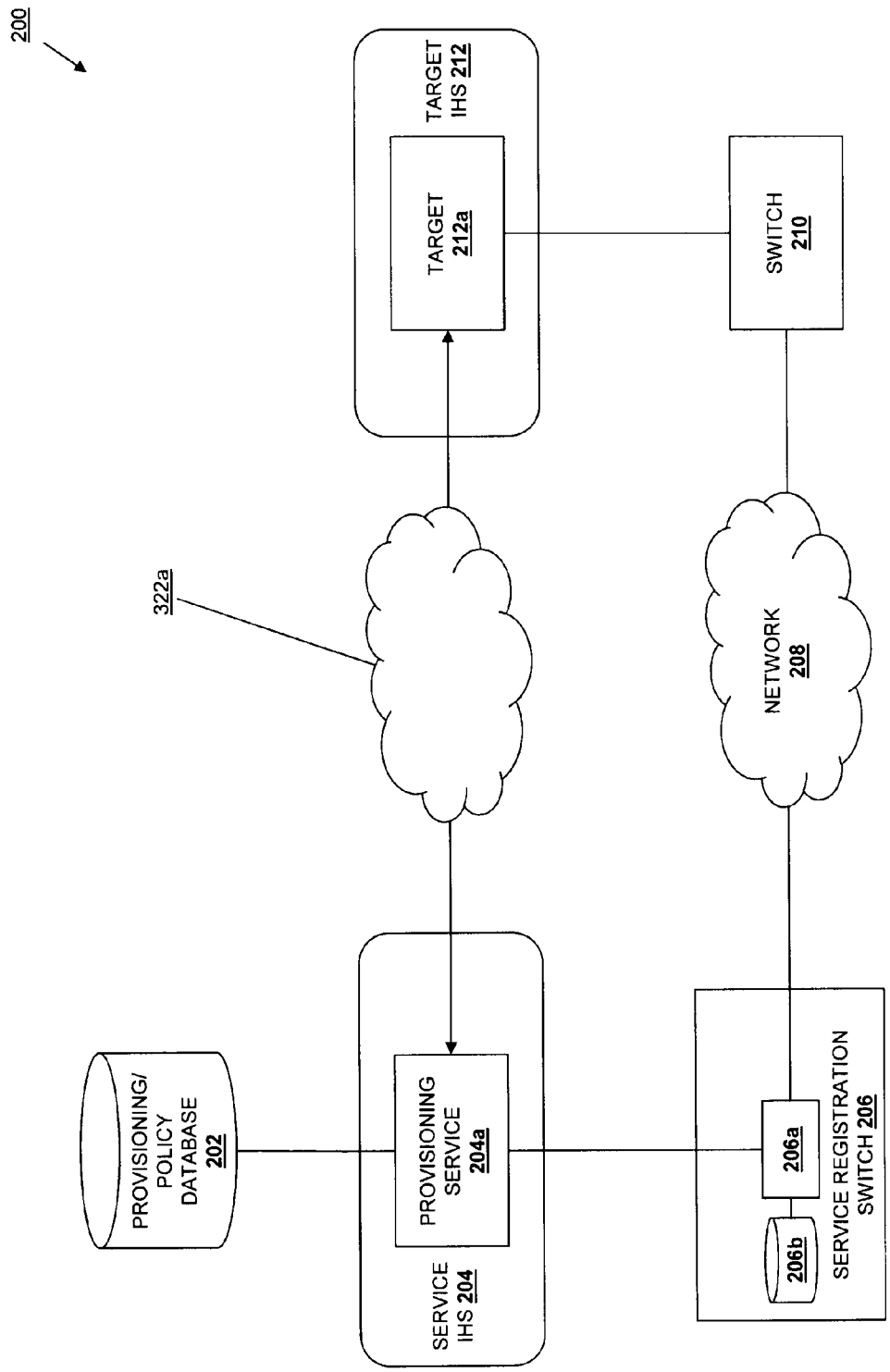

Referring now to FIGS. 3a and 3b, the method 300 the proceeds to block 322 where the target communicates with the service. Upon receiving the service communication message at block 318, the target 212a may utilize the information in the service communication message to communicate with the provisioning service 204a, and thus begin communications 322a with the provisioning service 204a through the networked system 200. Furthermore, as discussed with reference to optional block 320, if the provisioning service 204a requires that the target use a particular VLAN for communication, the port on the access switch for the target IHS 212 (e.g., a port on switch 210) will have already been added to that VLAN by the access switch. In the specific example where the provisioning service 204a is an LC controller and the target is an LC client, the LC client then exchanges certificates with the LC provisioning service and proceeds to conduct other LC communications known in the art. In another example, in which the service is a network management system (NMS), at block 322 the target 212a/client may announce itself to the NMS and exchange mutual authentication so that the NMS need not perform complex IP and port scanning to find its managed devices. In an embodiment, the communications between the service and target at block 322 are Layer 3 (L3) communications.

While the method 300 has been described above with reference to a single service (the provisioning service 204a) and a single target 212a, one of skill in the art will recognize how the networked system 200 may include any number of services and any number of targets. Furthermore, the method 300 may be performed any number of times to register a plurality of services with one or more service registration switches, and allow any number of targets to discover and communicate with any of those services. In some situations, multiple instances of the same service may be available in the networked system and registered with one or more service registration switches. In those situations, targets may receive multiple service communications messages in response to a multicast service discovery message, and those targets may determine which service to connect with by, for example, choosing the first service that responded, choosing the highest priority service that responded (e.g., services may respond with priority identifications), and/or otherwise choosing the service that responded with service specific information that is pertinent to the target 212a. In addition the portions of the networked system 200 including the service IHS 204, the provisioning service 204a, the target IHS 212, the target 212a, and the service registration switch 206 may be provided (e.g., by a particular IHS provider or providers) such that the method 300 is enabled, while also allowing for existing methods of discovery and communication enabled by other IHS providers that do not provide the enhanced network automation techniques as described herein.

Thus, a system and method have been described that allow target devices connected together by switches to have their targets automatically discover, and be discovered by, a management system without the need for user intervention. Such systems and method simplify user operation, thereby reducing operational costs, by allowing services to register with the network and therefore be discoverable, allowing targets to discover those services, and automatically setting up the communication path from the client to the service without any user interaction.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A network switch, comprising:
    a service registration database; and
    a service discovery engine that is coupled to the service registration database and that is operable to:
        receive a first service registration over a network from a first service included on a first service device and, in response, store the first service registration in the service registration database;
        receive a multicast service discovery message over the network from a target device, wherein the service discovery message includes a service identification; and
        determine that the service identification is associated with the first service registration stored in the service registration database and, in response, send a unicast service communication message over the network to the target device, wherein the service communication message includes communication information for the first service.

2. The network switch of claim 1, wherein the service discovery engine is further operable to:
    determine that the service identification is not associated with the first service registration stored in the service registration database and, in response, forward the multicast service discovery message through the network.

3. The network switch of claim 1, wherein the target devices is a first target device and wherein the switch further comprises:
    a port directly connected to a second target device, wherein the service discovery engine is further operable to:
        receive a unicast service communication message for the second target device from a different network switch over the network;
        snoop the service communication message packet to determine a Virtual Local Area Network (VLAN); and
        associate the port with the VLAN.

4. The network switch of claim 1, wherein the service discovery engine is further operable to:
    receive a second service registration over the network from a second service that is different from the first service and that is included on a second service device and, in response, store the second service registration in the service registration database.

5. The network switch of claim 4, wherein the service discover engine is further operable to:
    determine that the service identification is not associated with the first service registration and the second service stored in the service registration database and, in response, forward the multicast service discovery message through the network.

6. The network switch of claim 1, wherein the communication information for the first service includes a first service device Internet Protocol (IP) address.

7. The network switch of claim 1, wherein the unicast service communication packet is sent and the multicast service discovery message is received using layer 2 (L2) communications.

8. An information handling system, comprising:
    a service registration storage;
    a memory; and
    a processor that is coupled to the service registration storage and the memory, wherein the memory includes instructions that, when executed by the processor, cause the processor to:
        receive a service registration over a network from each of a plurality of services included on respective service devices and, in response, store the plurality of service registrations in the service registration storage;
        receive a multicast service discovery message over the network from a target device, wherein the service discovery message includes a service identification; and
        determine that the service identification is associated with a first service registration of the plurality of service registrations stored in the service registration storage and, in response, send a unicast service communication message over the network to the target device, wherein the service communication message includes communication information for a first service that provided the first service registration.

9. The IHS of claim 8, wherein the memory includes instructions that, when executed by the processor, further cause the processor to:
    determine that the service identification is not associated with any of the plurality of service registrations stored in the service registration database and, in response, forward the multicast service discovery message through the network.

10. The IHS of claim 8, wherein the target device is a first target device, and wherein the IHS further comprises:
    a port directly connected to a second target device, wherein the memory includes instructions that, when executed by the processor, further cause the processor to:
        receive a unicast service communication message for the second target device from a network switch over the network;
        snoop the service communication message to determine a Virtual Local Area Network (VLAN); and
        associate the port with the VLAN.

11. The IHS of claim 8, wherein the communication information for the first service includes a first service device Internet Protocol (IP) address.

12. The IHS of claim 8, wherein the unicast service communication packet is sent and the multicast service discovery message is received using layer 2 (L2) communications.

13. The IHS of claim 8, wherein the service discovery message including the service identification comprises a service discovery message including a first service identification and a second service identification that is different from the first service identification, and wherein the memory includes instructions that, when executed by the processor, further cause the processor to:
    determine that the first service identification is associated with the first service registration in the service registration storage;

determine that the second service identification is associated with a second service registration in the service registration storage; and send at least one unicast service communication message over the network to the target device, wherein the service communication message includes communication information for the first service that provided the first service registration and communication information for a second service that provided the second service registration.

14. The IHS of claim 13, wherein service discovery message including the service identification comprises a service discovery message including a third service identification that is different from the first service identification and the second service identification, and wherein the memory includes instructions that, when executed by the processor, further cause the processor to:

determine that the third service identification is not associated with any of the plurality of service registrations stored in the service registration database and, in response, forward a secondary multicast service discovery message that includes the third service identification through the network.

15. A method for providing service discovery, comprising:

receiving a first service registration over a network from a first service included on a first service device and, in response, storing the first service registration in a service registration database;

receiving a multicast service discovery message over the network from a target device, wherein the service discovery message includes a service identification; and determining that the service identification is associated with the first service registration stored in the service registration database and, in response, sending a unicast service communication message over the network to the target device, wherein the service communication message includes communication information for the first service.

16. The method of claim 15, further comprising:

determining that the service identification is not associated with the first service registration stored in the service registration database and, in response, forwarding the multicast service discovery message through the network.

17. The method of claim 15, wherein the target device is a first target device, and wherein the method further comprises:

receiving a unicast service communication message for a second target device from a network switch over the network;

snooping the service communication message to determine a Virtual Local Area Network (VLAN); and associating a port that is directly connected to the second target device with the VLAN.

18. The method of claim 15, further comprising:

receiving a second service registration over the network from a second service that is different from the first service and that is included on a second service device and, in response, storing the second service registration in the service registration database.

19. The method of claim 18, further comprising:

determining that the service identification is not associated with the first service registration and the second service stored in the service registration database and, in response, forwarding the multicast service discovery message through the network.

20. The method of claim 15, wherein the communication information for the first service includes a first service device Internet Protocol (IP) address, and wherein the unicast service communication message is sent and the multicast service discovery message is received using layer 2 (L2) communications.

\* \* \* \* \*